United States Patent [19]

Henriksen

[11] Patent Number: 5,290,131
[45] Date of Patent: Mar. 1, 1994

[54] BARBED SHANK FASTENER

[76] Inventor: Arne Henriksen, 3695 Winston Dr., Hoffman Estates, Ill. 60195

[21] Appl. No.: 989,996

[22] Filed: Dec. 7, 1992

Related U.S. Application Data

[63] Continuation of Ser. No. 673,471, Mar. 22, 1991, abandoned.

[51] Int. Cl.⁵ .............................................. F16B 37/04
[52] U.S. Cl. ...................................... 411/180; 411/338; 411/377; 411/424
[58] Field of Search ............... 411/180, 371, 377, 433, 411/437, 378, 337, 338, 366, 369, 373, 456, 424, 429, 431, 179, 177, 176, 173, 339, 168

[56] References Cited

U.S. PATENT DOCUMENTS

| | | |
|---|---|---|
| 73,088 | 1/1868 | Gardner . |
| 563,960 | 7/1896 | Kempshall . |
| 979,361 | 12/1910 | Vulpescu ............................ 411/366 |
| 1,867,354 | 3/1931 | Dickson . |
| 1,941,175 | 1/1931 | Johnson . |
| 1,966,835 | 7/1934 | Stites ................................. 411/424 |
| 2,001,290 | 5/1935 | Thomson ............................ 411/371 |
| 2,726,009 | 9/1952 | Murdock et al. . |
| 2,933,006 | 4/1960 | Gibb ................................... 411/373 |
| 3,134,290 | 5/1964 | Jentoft . |
| 3,273,441 | 9/1966 | Biesecker . |
| 3,462,114 | 8/1969 | O'Dell et al. .................... 411/338 X |
| 3,470,787 | 10/1969 | Mackie . |
| 3,618,444 | 11/1971 | Kay et al. .......................... 411/373 |
| 3,622,167 | 11/1971 | Velthoven ...................... 411/371 X |
| 3,693,495 | 9/1972 | Wagner . |
| 4,033,243 | 7/1977 | Kirrish et al. ..................... 411/338 |
| 4,046,181 | 9/1977 | Barnsdale ...................... 411/456 X |
| 4,154,138 | 5/1979 | Melone ............................. 411/373 |
| 4,293,243 | 10/1981 | Graybeal et al. . |
| 4,316,690 | 2/1982 | Voller . |
| 4,373,842 | 2/1983 | Bettini et al. . |
| 4,452,556 | 6/1984 | Nelson et al. . |
| 4,472,097 | 9/1984 | Kiefer et al. . |
| 4,482,278 | 11/1984 | Dorn . |
| 4,490,083 | 12/1984 | Rebish . |

FOREIGN PATENT DOCUMENTS

| | | | |
|---|---|---|---|
| 1076611 | 10/1954 | France .............................. 411/177 |
| 2398913 | 2/1979 | France .............................. 411/373 |
| 2453307 | 12/1980 | France .............................. 411/180 |
| 831795 | 3/1960 | United Kingdom .............. 411/168 |
| 2026642 | 2/1980 | United Kingdom .............. 411/179 |

*Primary Examiner*—Rodney M. Lindsey
*Attorney, Agent, or Firm*—Hill, Steadman & Simpson

[57] ABSTRACT

A fastener assembly to be used in the construction of semi-trailers consisting of a first fastener having a head and a shank, a mating second fastener, and a plurality of radially spaced projecting barbs formed on the shank. The barbs, which may also be spaced axially on the shank, engage in a hole for receiving the first fastener to prevent rotation and removal of the first fastener. The first fastener may also be provided with an encapsulating cover with two sealing points on its underside to seal the fastener to a surface through which the fastener is inserted.

4 Claims, 1 Drawing Sheet

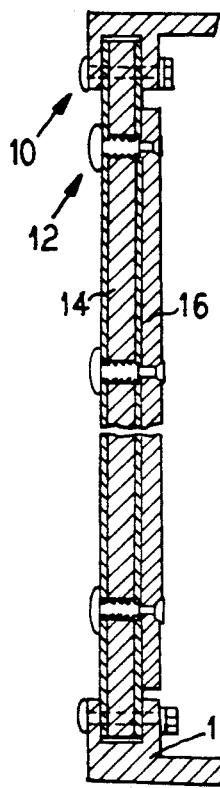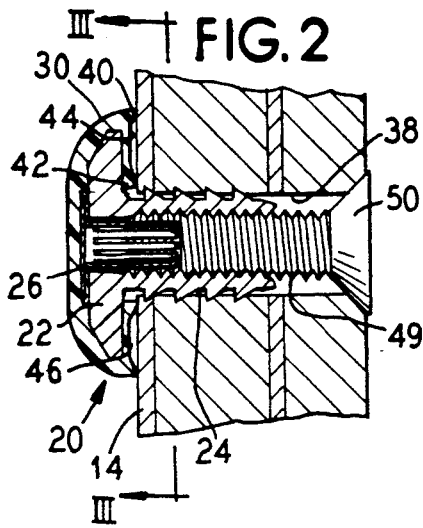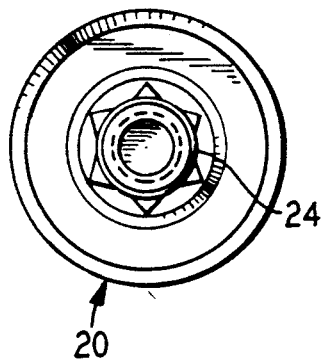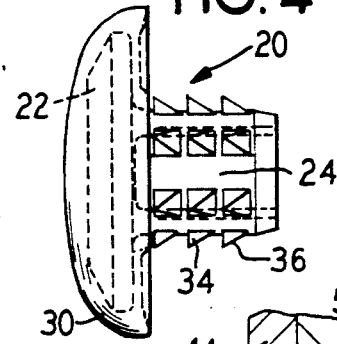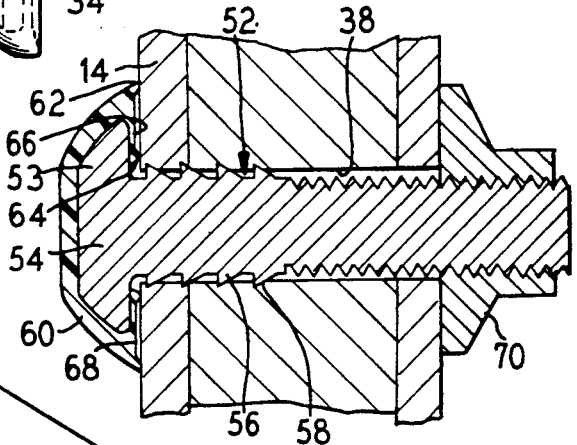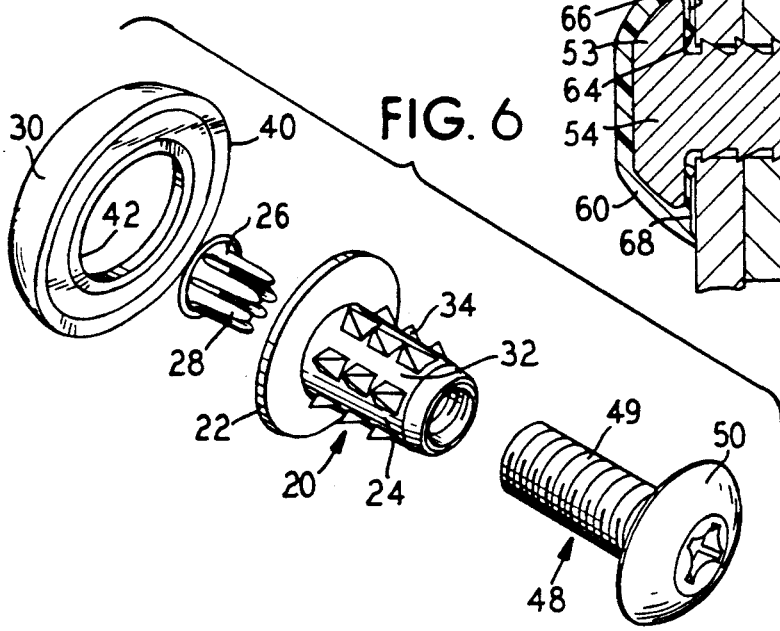

BARBED SHANK FASTENER

This is a continuation of application Ser. No. 07/673,471, filed Mar. 22, 1991 now abandoned.

BACKGROUND OF THE INVENTION

The present invention relates to a fastener assembly, and in particular to a fastener assembly having a barbed shank and an encapsulating plastic seal protecting the exterior portion of the fastener assembly.

It is well known in the art to encapsulate fasteners with some type of a plastic covering. Such covered heads are disclosed in U.S. Pat. Nos. 73,088; 563,969; 1,941,175; 1,867,354; 3,470,787; 3,693,495 and 4,293,243. Other types of covered heads are disclosed in U.S. Pat. Nos. 3,134,290; 4,316,690; 4,373,842; and 4,482,278.

In addition to the need for a covered head to prevent corrosion of the fastener, there is a shortcoming in presently used fasteners in some situations and environments in that a first part of a fastener, such as a T-nut on a screw, is applied from one side of a wall or other structure and the second part of the fastener, such as a screw or a locking nut, respectively, is applied from the other side of the wall or structure not accessible to the person applying the first portion of the fastener. Therefore at least two persons are required for the assembly operation, or else one person must insert all of the first portions of the fasteners from one side of the wall and then must hope that those fasteners will not fall out, be pushed out, or turn when the second parts of the fasteners are being applied from the other side of the wall. Oftentimes, for example in the applying threaded fasteners through the wall of a semitrailer truck body, the first fastener parts become dislodged or turn while the nuts are being applied thus requiring two persons to complete the operation of applying the fasteners to the truck body.

It would be an improvement in the art if a fastener were provided which obviated the necessity of requiring two persons to complete the assembly of the fasteners to the truck body.

SUMMARY OF THE INVENTION

The present invention provides an improved fastener assembly which permits assembly of a first fastener part through a wall to a second fastener part without requiring a person on each side of the wall. The first fastener part may comprise a T-nut which has a shank with external barbs projecting therefrom and a hollow body with an internal thread therein. A second fastener member in the form of a screw is introduced from an opposite side of the wall into the hollow interior of the barbed shank to complete the fastener assembly. The barbed shank prevents the first portion of the fastener assembly from coming loose or from rotating while the threaded fastener is being inserted and tightened to the first fastener part. The first fastener part may alternatively be a screw with a barbed shank and the second fastener part would then be a nut.

The barbs on the shank of the first fastener part are arranged to allow for fairly easy entry of the first fastener part in to the wall, yet prevent readily removal of the first fastener part from the wall. The barbs are spaced around the circumference of the shank to prevent rotation of the first fastener part in the wall.

In a preferred embodiment of the invention the head of the first fastener part may have an encapsulating plastic seal provided thereon to protect the exterior portion of the fastener assembly. Such a seal preferably would have two sealing points on the underside of the head being an outer lip and an inner lip. The outer lip should be formed to extend radially outwardly when the fastener assembly is secured in place and the inner lip should be formed to extend radially inwardly when the fastener assembly is secured in place.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 1 is a cross-sectional view of a semi-trailer wall showing the encapsulated and barbed fasteners in place.

FIG. 2 is a cross-sectional view of a fastener assembly in place where the first fastener is a T-nut.

FIG. 3 is a cross-sectional view taken generally along line III—III of FIG. 2.

FIG. 4 is a cross-sectional view of the barbed and encapsulated T-nut head of FIG. 2.

FIG. 5 is a cross-sectional view of a fastener assembly in place where the encapsulated and barbed first fastener is a screw.

FIG. 6 is a perspective view of a disassembled encapsulated and barbed T-nut fastener assembly.

DETAILED DESCRIPTION OF THE PREFERRED EMBODIMENTS

FIG. 1 illustrates an encapsulated and barbed screw fastener assembly, generally designated 10, and an encapsulated T-nut fastener assembly, generally designated 12, in fastening positions. A semi-trailer wall 14 is made of a single piece of glass fiber reinforced plywood and has a protective perforated metal sheet 16 as an interior backing. The top and bottom portions of the glass fiber reinforced plywood 12 are received in an aluminum channel 18.

The T-nut assembly 12 consists of a first fastener part, generally designated 20, which may be a t-nut having a T-nut head 22 and a hollow T-nut post 24 which is interiorly threaded. This is best illustrated in FIG. 6. An opening at the top of the T-nut head 23 is closed off by insertion of a plug 26, which has a plurality of downwardly projecting prongs 28 to secure the plug in place as shown in FIG. 2. The T-nut head 22 is completely covered by a dome-shaped encapsulating plastic seal 30. The plastic seal 30 can be colored to match the surface to which will be attached. It can also be made of a luminescent material or of a reflective material in that truck bodies have on the order of 200–300 bolts on the side of a forty foot semi-trailer and approximately 50 bolts on the rear end. Thus, the use of such an encapsulated fastener would enhance the safety considerations of operating a semi-trailer or other vehicle.

The hollow T-nut post 24 has a shank 32 which has a plurality of radially and axially spaced barbs 34 formed thereon around the periphery. The barbs 34 have a ramped surface 36 facing in the insertion direction which permits the first fastener part 20 to be relatively easily inserted into a hole 38 formed in the trailer wall 14 while preventing or retarding removal of the first fastener part. The radial spacing of the barbs 34 prevents the first fastener part 20 from rotating within the insertion hole 38.

The underside of the seal 30 has two sealing points, an outer lip 40 and an inner lip 42 which extends down slightly further than the outer lip 40. When the fastener assembly 12 is tightened into position, the outer lip 40 is pushed radially downwardly and outwardly, When the fastener assembly 12 is tightened into position, the inner lip 42 is pushed downwardly and inwardly (toward the T-nut shank 32). The two lips 40 and 42 are oppositely sloped to form an elevated flat surface 44 which, when the fastener is secured in place, leaves a small space 46 between the seal 30 and the wall 14. The mating fastener for the T-nut is a conventional screw generally designated 48, having a threaded shank 49 and a head 50.

FIG. 5 illustrated the encapsulated screw assembly 10. A first fastener part in the form of a screw generally designated 52, has a head 53, and a shank or post 54, the top portion of the post 54 having a plurality of radially and axially spaced barbs 56 provided around the periphery. As described above, the barbs have a ramped surface 58 facing in the insertion direction which permits the first fastener part 52 to be relatively easily inserted while preventing or retarding removal of the first fastener part. The radial spacing of the barbs prevents the first fastener part from rotating within the insertion hole 38. The screw head 53 is covered by a dome-shaped encapsulating plastic seal 60, the underside of which has two sealing points, an outer lip 62 and an inner lip 64, which extends down slightly further than the outer lip 62. When the fastener assembly 10 is tightened into position, the outer lip 62 is pushed radially downwardly and outwardly and the inner lip 64 is pushed radially downwardly and inwardly (toward the barbs 52). The outer lip 62 and the inner lip 64 are oppositely sloped to form an elevated flat surface 66. When the fastener assembly 10 is in place, the elevated flat surface 66 does not come into flat contact with the fastening surface, thereby leaving a small space 68. The second fastener in this assembly is a nut 70.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A fastener assembly comprising:
   a first fastener having a head engageable with a fastening surface and a shank with a threaded portion on said shank at an end opposite said head, and an unthreaded portion of said shank, between said head and said threaded portion, having a generally cylindrical outer peripheral surface;
   a mating second fastener;
   a plurality of spaced-apart axial rows of projecting barbs spaced radially on said peripheral surface of said unthreaded portion of said shank, each of said barbs having a ramp surface thereon facing away from said head, said barbs being disposed on said shank with portions of said peripheral surface of said unthreaded portion of said shank intervening between adjacent axial rows of barbs;
   a domed-shaped encapsulating plastic seal completely covering said head of said first fastener;
   said seal extending under and covering the bottom surface of said head;
   the underside of said seal having two sealing areas, an outer lip and an inner lip each of said lips angularly extending away from a planar surface of said seal;
   said outer lip being formed to extend radially outwardly when said fastener assembly is secured in place; and
   said inner lip being formed to extend radially inwardly when said fastener assembly is secured in place;
   said planar surface extending uninterrupted between said outer lip and said liner lip to form a single annular space between said inner and outer lips bounded by said planar surface and said fastening surface;
   whereby said first and second fastener members are applied to components to be secured together from opposite sides thereof.

2. A fastener assembly according to claim 1, wherein said first fastener is a T-nut and said second fastener is a screw.

3. A fastener assembly according to claim 1, wherein said first fastener is a screw and said second fastener is a nut.

4. A fastener assembly according to claim 1, wherein said projecting barbs are also disposed in circumferential rows, with portions of said peripheral surface of said unthreaded portion of said shank intervening between adjacent circumferential rows of barbs.

* * * * *